United States Patent
Schnitter et al.

(10) Patent No.: US 12,384,692 B2
(45) Date of Patent: Aug. 12, 2025

(54) HIGH-PURITY TUNGSTEN(VI) OXYTETRACHLORIDE AND PROCESS FOR PREPARING SAME

(71) Applicant: TANIOBIS GMBH, Goslar (DE)

(72) Inventors: Christoph Schnitter, Holle (DE); Holger Brumm, Goslar (DE); Gerd Passing, Huerth (DE); Tomasz Kupka, Goslar (DE)

(73) Assignee: TANIOBIS GMBH, Goslar (DE)

(*) Notice: Subject to any disclaimer, the term of this patent is extended or adjusted under 35 U.S.C. 154(b) by 595 days.

(21) Appl. No.: 17/790,760

(22) PCT Filed: Jan. 4, 2021

(86) PCT No.: PCT/EP2021/050013
§ 371 (c)(1),
(2) Date: Jul. 5, 2022

(87) PCT Pub. No.: WO2021/140065
PCT Pub. Date: Jul. 15, 2021

(65) Prior Publication Data
US 2023/0061639 A1   Mar. 2, 2023

(30) Foreign Application Priority Data

Jan. 7, 2020 (DE) .................. 10 2020 200 087.5
Dec. 8, 2020 (DE) .................. 10 2020 132 629.7

(51) Int. Cl.
*C01G 41/00* (2006.01)

(52) U.S. Cl.
CPC .......... *C01G 41/00* (2013.01); *C01P 2002/70* (2013.01); *C01P 2004/02* (2013.01); *C01P 2004/61* (2013.01)

(58) Field of Classification Search
None
See application file for complete search history.

(56) References Cited

U.S. PATENT DOCUMENTS

2017/0352549 A1   12/2017   Hendrix
2021/0053839 A1   2/2021    Takahashi

FOREIGN PATENT DOCUMENTS

DE      3347918 C2     8/1983
EP      3 738 928 A1   11/2020
(Continued)

OTHER PUBLICATIONS

Gelbard et al, "Tungsten Oxytetrachloride and several Tungstate salts", Inorganic Syntheses, 2014, vol. 36 Ch 27, 143-148 (Year: 2014).*

(Continued)

*Primary Examiner* — Michael Forrest
*Assistant Examiner* — Nicole Lee Quist
(74) *Attorney, Agent, or Firm* — Norman B. Thot

(57) ABSTRACT

A tungsten(VI) oxytetrachloride having a chemical purity of greater than 99.95%. The tungsten(VI) oxytetrachloride has a fraction of compounds selected from $WCl_6$, $WO_2Cl_2$, $WO_3$ and $WO_2$, as defined as a ratio of a reflection having a highest intensity of one of $WCl_6$, $WO_2Cl_2$, $WO_3$ and $WO_2$, (I(P2)100) in an x-ray diffraction pattern to a reflection having a highest intensity of the tungsten(VI) oxytetrachloride (I($WOCl_4$)100) in the x-ray diffraction pattern, expressed as I(P2)100/I($WOCl_4$)100, of less than 0.03.

16 Claims, 10 Drawing Sheets

(56) References Cited

FOREIGN PATENT DOCUMENTS

| | | |
|---|---|---|
| JP | 2019-519109 A | 7/2019 |
| WO | WO 2020/084852 A1 | 4/2020 |

OTHER PUBLICATIONS

Reitfort-Baysal et al, "Tungsten oxytetrachloride and (acetonitrile)tetrachlorogungsten imido complexes", Inorganic syntheses, 2014, vol. 36 Ch 26, 138-143 (Year: 2014).*

Pedersen et al, "Preparation of Tungsten(VI) Phenylimido Alkyl and Alkylidene Complexes", Journal of American Chemical Society, 1982, 104, 7483-7491 (Year: 1982).*

Screenshot of American Elements webpage (Year: 2015).*

P.C. Crouch, F. Zado et al.: "The high yield synthesis of the tungsten(VI) oxyhalides $WOCl_4$, $WOBr_4$ and $WO_2Cl_2$ and some observations on tungsten(VI) bromide and tungsten(V) chloride", Journal of Inorganic and Nuclear Chemistry, vol. 32, pp. 329-333 (1970).

R. H. Crabtree et al.: "On a convenient synthesis of $WOCl_4$ and the question of the existence of $Cp_2WOCl_2$", Polyhedron, vol. 4, No. 3, pp. 521-522 (1985).

N. Ozer et al.: "Optical and Electrochromic Properties of Sol-Gel Deposited Doped Tungsten Oxide Films", pp. 1-14 (Jan. 1996)).

A.E. Castro Luna et al.: "Vapor Pressure of $WOCl_4$", J. Chem. Eng., vol. 28, pp. 349-350 (1983).

ASTM B329-06: "Standard Test Method for Apparent Density of Metal Powders and Compounds Using the Scott Volumeter", pp. 1-3 (2006).

ASTM B822-10: "Standard Test Method for Particle Size Distribution of Metal Powders and Related Compounds by Light Scattering", pp. 1-4 (2010).

Product Datasheet: "Tungsten(VI) Oxychloride", American Elements, https://www.americanelements.com/printpdf/product/19936/datasheet (retrieved Sep. 11, 2020).

D. E. Rosner et al.: "Ablation Rates in Mixtures of Reactive Gases", AIAA Journal, vol. 5, No. 8, pp. 1490-1492 (1967).

* cited by examiner

HIGH-PURITY TUNGSTEN(VI) OXYTETRACHLORIDE AND PROCESS FOR PREPARING SAME

CROSS REFERENCE TO PRIOR APPLICATIONS

This application is a U.S. National Phase application under 35 U.S.C. § 371 of International Application No. PCT/EP2021/050013, filed on Jan. 4, 2021 and which claims benefit to German Patent Application No. 10 2020 200 087.5, filed on Jan. 7, 2020 and to German Patent Application No. 10 2020 132 629.7, filed on Dec. 8, 2020. The International Application was published in German on Jul. 15, 2021 as WO 2021/140065 A1 under PCT Article 21(2).

FIELD

The present invention relates to tungsten(VI) oxytetrachloride which has a particular chemical purity and phase purity, and also to a method for the production thereof.

BACKGROUND

Tungsten(VI) oxytetrachloride is an inorganic compound of tungsten from the group of the oxychlorides, having the stoichiometric formula $WOCl_4$. Tungsten(VI) oxytetrachloride is used primarily as a catalyst for the production of olefins, especially in ring-opening reactions. Further fields of use for tungsten(VI) oxytetrachloride are found in the semiconductor industry and as a starting compound in sol-gel processes.

DE 33 47 918 A1 describes a glass substrate having a thermochromic coating containing $VO_2$ or $V_2O_3$, with variable transmissibility for solar rays, where an optical change takes place within a temperature range from 25 to 75° C. and the transmissibility for the entire solar energy in the infrared range decreases by a factor of at least two when the coating is heated through its temperature transition range. The coating containing $VO_2$ or $V_2O_3$ is a layer which is produced by chemical decomposition and optionally reduction of a chemically deposited vanadium compound and which is doped with oxides of metals having a larger ionic radius than vanadium. Suitable dopants identified include $WOCl_4$ which, when added, is able to lower the transformation temperature of the $VO_2$ film.

N. Özer et al., in their essay "Optical and Electrochromic Properties of Sol-Gel Deposited Doped Tungsten Oxide Films" from January 1996, describe the use of $WOCl_4$ as a precursor compound in the production of films doped with tungsten oxide.

The skilled person knows of various methods for the production of tungsten(VI) oxytetrachloride including, for example, by reaction of tungsten(VI) oxide, tungsten(VI) chloride or sodium tungstate with thionyl chloride, or by thermal decomposition of tungsten(VI) dioxide dichloride. Other production methods include the boiling of tungsten(VI) oxide in octachlorocyclopentene or the reaction of stoichiometric amounts of tungsten(VI) oxide with tungsten(VI) chloride in an evacuated ampoule at 200° C.

F. Zado, in his essay "The high yield synthesis of the tungsten(VI) oxyhalides $WOCl_4$, $WOBr_4$ and $WO_2Cl_2$ and some observations on tungsten(VI) bromide and tungsten(V) chloride", published in J. Inorg. Nucl. Chem. 25, 1115 (1963), describes the preparation of tungsten(VI) oxytetrachloride by sealing $WCl_6$ and $WO_3$ in an evacuated ampoule and heating the ampoule to 100° C. The temperature was raised after two hours to 150° C. and the ampoule was positioned so that the deposited product could be sublimed over a period of 24 hours.

A. E. Castro Lunar et al., in J. Chem. Eng. Data 1983, 26, 349-350, under the title "Vapour Pressure of $WOCl_4$", describe the preparation of tungsten(VI) oxytetrachloride by reaction of $CCl_4$ with $WO_3$ at 673 K.

Examples of other known preparation methods for tungsten(VI) oxytetrachloride are the reaction of $WCl_6$ with an organosilicon compound according to the equation:

the aforementioned use of thionyl chloride according to the equation,

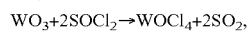

and also the one-step reaction of heated tungsten in oxygen-containing $Cl_2$ gas.

The methods described in the prior art have the disadvantage, however, that the tungsten(VI) oxytetrachloride usually has a significant fraction of impurities, such as metallic impurities and other tungsten compounds, which are manifested in further crystal phases, and the methods can be employed only on a laboratory scale. The chemical purity of commercially available tungsten(VI) oxytetrachloride is hence stated at 98% to 99.95%, based on metallic impurities. The majority of the metallic impurities can certainly be removed by further purification steps, such as sublimation. The sublimation, however, results in increased crystal growth, so that the tungsten(VI) oxytetrachloride takes the form of large, acicular crystals having a low bulk density, which is disadvantageous for a series of applications. To obtain suitable particle sizes, the crystals must be processed appropriately, for example, by grinding methods. Owing to the low stability of tungsten(VI) oxytetrachloride, however, this leads to the introduction of metallic impurities and to the formation of unwanted phases. A further, exacerbating factor, is that the decomposition of tungsten(VI) oxytetrachloride is accompanied by the formation of highly corrosive compounds such as hydrochloric acid. The purification methods that are conventionally required also have the disadvantage that some impurities, especially further tungsten compounds and certain non-metals, cannot be sufficiently removed, if at all.

SUMMARY

An aspect of the present invention is to provide tungsten(VI) oxytetrachloride that overcomes the disadvantages of the prior art, and to also provide a simple and efficient method for its production, which can be implemented even on an industrial scale and which operates without additional steps of mechanical work-up, such as grinding, sieving or subliming.

In an embodiment, the present invention provides a tungsten(VI) oxytetrachloride which comprises a chemical purity of greater than 99.95%. The tungsten(VI) oxytetrachloride comprises a fraction of compounds selected from the group consisting of $WCl_6$, $WO_2Cl_2$, $WO_3$ and $WO_2$, as defined as a ratio of a reflection having a highest intensity of one of $WCl_6$, $WO_2Cl_2$, $WO_3$ and $WO_2$, (I(P2)100) in an x-ray diffraction pattern to a reflection having a highest intensity of the tungsten(VI) oxytetrachloride (I($WOCl_4$) 100) in the x-ray diffraction pattern, expressed as I(P2)100/I($WOCl_4$)100, of less than 0.03. The tungsten(VI) oxytetrachloride thereby has a high chemical and crystallographic purity and a specific morphology.

BRIEF DESCRIPTION OF THE DRAWINGS

The present invention is described in greater detail below on the basis of embodiments and of the drawings in which.

DETAILED DESCRIPTION

Figure 1:
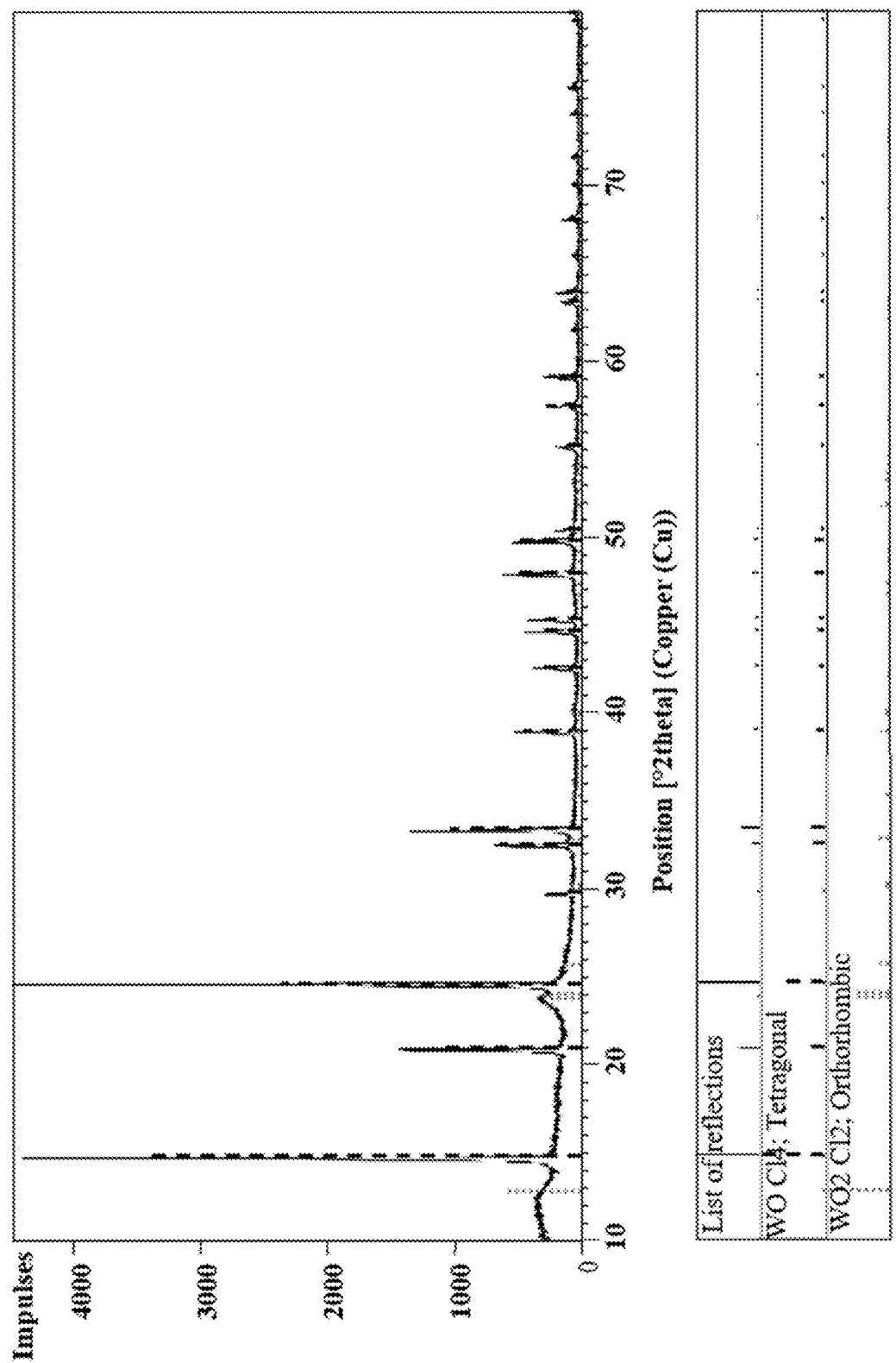
FIG. 1 shows an x-ray diffraction pattern of the tungsten (VI) oxytetrachloride obtained from Comparative Example 1.

The present application provides a tungsten(VI) oxytetrachloride which has a chemical purity of greater than 99.95% and where the tungsten(VI) oxytetrachloride has a fraction of compounds selected from the group consisting of $WCl_6$, $WO_2Cl_2$, $WO_3$ and $WO_2$, defined as the ratio of the reflection having the highest intensity of one of these compounds (I(P2)100) in the x-ray diffraction pattern to the reflection having the highest intensity of the tungsten(VI) oxytetrachloride (I(WOCl$_4$)100) in the x-ray diffraction pattern, expressed as I(P2)100/I(WOCl$_4$)100, of less than 0.03.

The tungsten(VI) oxytetrachloride in accordance with the present invention is more particularly tungsten(VI) oxytetrachloride of the empirical formula $WOCl_4$.

In the context of the present invention, the chemical purity of a $WOCl_4$ sample refers to the ratio of the accumulated weight proportions of the element's tungsten, chlorine and oxygen to the accumulated weight proportions of all other impurifying elements in the sample. The purity of the substance is expressed as a quantitative ratio of $WOCl_4$ to the overall weight of composition, with a substance having a chemical purity of 100% if there are no other elements present except tungsten, chlorine and oxygen. Impurities in the sense of the present invention encompass not only metallic impurities but also non-metallic impurities, in particular silicon, carbon, sulfur, molybdenum and nickel and components thereof.

The chemical purity must thereby be distinguished from the crystallographic purity. In the context of the present application, the crystallographic purity of a substance is the ratio of the crystal phase of an unwanted compound to the crystal phase of the desired compound, presently tungsten (VI) oxytetrachloride. The ratio of the crystal phases can here be determined, for example, via the intensities of the various phases in an x-ray diffraction pattern. Suitable recordings can be made on powder samples using, for example, an instrument from Malvern-PANalytical (X'Pert-MPD with semiconductor detector, Cu LFF x-ray tube with 40 KV/40 mA, Ni filter).

Besides the stated chemical impurities, conventional tungsten(VI) oxytetrachloride may comprise further compounds, such as, for example, $WCl_6$, and optionally further tungsten oxides as what are called secondary phases. These oxides are, primarily, the related oxides $WO_2Cl_2$, $WO_3$ and $WO_2$, which possess a different crystal structure from tungsten(VI) oxytetrachloride and are detectable via x-ray diffractometry. The tungsten(VI) oxytetrachloride of the present invention can, for example, comprise substantially no further tungsten compounds and in particular no further tungsten oxide compounds. The tungsten(VI) oxytetrachloride of the present invention can, for example, be substantially free of compounds selected from the group consisting of $WCl_6$, $WO_2Cl_2$, $WO_3$ and $WO_2$. The fraction of further compounds as recited above may be defined by way of the intensity ratio of the main tungsten(VI) oxytetrachloride phase to the stated secondary phases. The main and secondary phases may be ascertained via their reflection intensities in the x-ray diffraction pattern, indicated there as impulses per angle [°2theta]. The ratio of the reflection having the highest intensity of a secondary phase (I(P2)100) to the reflection having the highest intensity of the main tungsten (VI) oxytetrachloride phase (I(WOCl$_4$)100), expressed as I(P2)100/I(WOCl$_4$)100, can, for example, be less than 0.02, for example, 0.001 to 0.02, for example, 0.001 to 0.01, determined in each case by x-ray diffractometry. The tungsten(VI) oxytetrachloride of the present invention is regarded in the context of the present invention as being substantially free of compounds selected from the group consisting of $WCl_6$, $WO_2Cl_2$, $WO_3$ and $WO_2$ and declared as secondary phases in the context of the present invention if the ratio of the main and secondary phases as defined above is 0.001 or less. No secondary phases can, for example, be detectable. The fractions of further tungsten compounds are here ascertained via x-ray diffractometry, determined, for example, on powder samples using an instrument from Malvern-PANalytical (X'Pert-MPD with semiconductor detector, Cu LFF x-ray tube with 40 KV/40 mA, Ni filter).

The tungsten(VI) oxytetrachloride of the present invention can, for example, have a chemical purity of 99.99% or more, for example, 99.995% or more, and, for example, 99.999% or more.

Conventional tungsten(VI) oxytetrachloride generally has a series of chemical impurities which can have a disruptive influence on further uses of the tungsten(VI) oxytetrachloride. These chemical impurities, depending on the production method, are, more particularly, silicon and its compounds, sulfur and its compounds, and also carbon, molybdenum and iron. In contrast thereto, the tungsten(VI)

oxytetrachloride of the present invention is notable for a low level of impurities. The tungsten(VI) oxytetrachloride of the present invention can, for example, comprise silicon and/or compounds of silicon in an amount of less than 50 ppm, for example, in an amount of less than 25 ppm and, for example, in an amount of less than 5 ppm, the data being based in each case on the total weight of the tungsten(VI) oxytetrachloride.

In an embodiment of the present invention, the tungsten (VI) oxytetrachloride can, for example, comprise sulfur and/or compounds of sulfur in an amount of less than 100 ppm, for example, in an amount of less than 30 ppm and, for example, in an amount of less than 10 ppm, the data being based in each case on the total weight of the tungsten(VI) oxytetrachloride.

The fraction of metallic impurities, apart from silicon, is overall less than 100 ppm, for example, less than 70 ppm and, for example, less than 50 ppm, with the data being based in each case on the total weight of the tungsten(VI) oxytetrachloride. The metallic impurities may, for example, be elements from main groups 2 and 3, refractory metals, and more particularly iron, chromium, nickel and molybdenum. In an embodiment, the tungsten(VI) oxytetrachloride of the present invention can, for example, have a fraction of molybdenum and/or its compounds of less than 20 ppm, for example, less than 10 ppm, and, for example, less than 5 ppm, based in each case on the total weight of the tungsten (VI) oxytetrachloride.

In an embodiment of the present invention, the tungsten (VI) oxytetrachloride can, for example, comprise carbon in an amount of less than 200 ppm, for example, in an amount of less than 100 ppm, and, for example, in an amount of less than 40 ppm, the data being based in each case on the total weight of the tungsten(VI) oxytetrachloride.

As well as its high chemical and crystallographic purity, the tungsten(VI) oxytetrachloride of the present invention is moreover notable for its morphology. Whereas conventional tungsten(VI) oxytetrachloride generally takes the form of large acicular crystals, this has surprisingly not been observed with the tungsten(VI) oxytetrachloride of the present invention. In an embodiment, the tungsten(VI) oxytetrachloride of the present invention can therefore take the form of a fine powder, with 90% of all the powder particles having a particle size of 100 μm or less, for example, of 70 μm or less, determined by optical microscopy, and where the particle size denotes the longest extent of the particle. The percentage figure here is based on the total number of powder particles. It has surprisingly been found that the specific morphology of the tungsten(VI) oxytetrachloride of the present invention improves the dissolution kinetics of the tungsten(VI) oxytetrachloride in the further application.

As a result of the specific morphology of the tungsten(VI) oxytetrachloride of the present invention, it has moreover been possible to achieve a distinct improvement in the bulk density, sometimes also referred to as bulk weight. In an embodiment, the tungsten(VI) oxytetrachloride of the present invention can, for example, have a bulk density of more than 0.5 g/cm³. The bulk density $\rho_b$ is defined as the ratio of the mass m of the bed to the bed volume occupied, $V_b$, according to the formula:

$$\rho_b = \frac{m}{Vb}$$

and can be determined by means of ASTM B 329-06.

The present invention also provides a method for producing the tungsten(VI) oxytetrachloride. The method of the present invention is notable for the fact that in a first step a) tungsten metal is reacted with chlorine gas and oxygen at a temperature T(1) and the resulting product mixture is subjected in a further step b) to an oxidation at a temperature T(2) in the presence of an oxidizing agent to give the tungsten(VI) oxytetrachloride of the present invention.

The tungsten metal used in step a) can, for example, be a metal powder having a particle size D90 of less than 300 μm, for example, having a particle size D90 of less than 150 μm, determined via ASTM B 822. The D90 of the particle size here denotes the fraction of particles which have a particle size less than the specified value.

The reaction in step a) of the method of the present invention can, for example, be conducted at a temperature T(1) of 600 to 1000° C.

Without being tied to a particular theory, it is assumed that in step a) of the method of the present invention, the reaction of the tungsten metal with chlorine gas and oxygen produces a mixture of tungsten(VI) oxytetrachloride and tungsten(VI) chloride. In the context of the method of the present invention, it has surprisingly been found that in a further step, the tungsten(VI) chloride obtained can be selectively oxidized to tungsten(VI) oxytetrachloride, thereby providing tungsten (VI) oxytetrachloride having a high purity and a specific morphology.

The method of the present invention also provides the advantage that tungsten(VI) oxytetrachloride is produced in high chemical and crystallographic purity and so makes it unnecessary to employ further work-up steps such as, for example, subliming. In an embodiment of the method of the present invention, further purification steps and/or operating steps, especially subliming and/or grinding, can, for example, be omitted. Without being tied to a particular theory, it is assumed that the omission of additional operating steps, such as subliming, grinding or sieving, contributes to the production, by virtue of the method of the present invention, of tungsten(VI) oxytetrachloride which is present in the form of small particles, in contrast to conventional tungsten(VI) oxytetrachloride.

The oxidizing agent used in step b) can, for example, be selected from the group consisting of oxygen, water and steam. The oxidizing agent used in step b) of the method of the present invention can, for example, be water or steam. When water is used as the oxidizing agent in step b) of the method of the present invention, the oxidation can, for example, be carried out at a relative atmospheric humidity of 20% to 80%, for example, of 40% to 60%.

The oxidation of tungsten chloride compounds takes place conventionally at temperatures of 300° C. or more. In the context of the method of the present invention, it has surprisingly been found that the oxidation may also be performed at significantly lower temperatures without the formation of higher oxides or oxychlorides, such as $WO_2Cl_2$ or $WO_3$, and without any detractions from the yield, especially when using water as the oxidizing agent. In an embodiment, the oxidation in step b) can, for example, be performed at a temperature T(2) of 0 to 80° C., for example, 0 to 60° C., for example, for a period of 5 minutes to 50 hours.

It has also proven to be advantageous to perform the reaction of the tungsten metal with oxygen and chlorine gas, contrary to the general expectation, in an atmosphere in which the oxygen is in a substoichiometric ratio in relation to the tungsten metal. In an embodiment, the oxygen in step a) can, for example, be used in a substoichiometric ratio. The stoichiometric ratio of oxygen to tungsten metal in step a) of the method of the present invention can, for example, be 0.85 to 0.97, for example, 0.85 to 0.9.

A series of methods known in the prior art for producing tungsten(VI) oxytetrachloride are based on the use of organic compounds, especially organic sulfur compounds and organosilicon compounds. In the context of the present invention, it has surprisingly been found that tungsten(VI) oxytetrachloride can be obtained in high purity under mild conditions even without the use of such compounds, some of which are injurious to health. An embodiment of the method of the present invention therefore provides that no sulfur compounds and/or silicon compounds and/or chlorinated hydrocarbons are used in the method of the present invention.

The tungsten(VI) oxytetrachloride produced according to the method of the present invention differs not only in terms of its purity but also, in particular, in terms of its morphology from tungsten(VI) oxytetrachloride produced by conventional methods. A further subject of the present invention is, therefore, tungsten(VI) oxytetrachloride which has been produced according to the method of the present invention. A feature of the tungsten(VI) oxytetrachloride produced by the method of the present invention is that 90% of all the particles have a particle size of 100 μm or less, for example, 70 μm or less, determined by optical microscopy. The percentages are here based on the total number of particles. The particle size here denotes the longest dimension of the particle.

The present invention also provides for the use of the tungsten(VI) oxytetrachloride of the present invention or of the tungsten(VI) oxytetrachloride obtained according to the method of the present invention as a catalyst in chemical reactions, more particularly in the preparation of functional hydrocarbons, in the semiconductor industry, and/or in sol-gel processes, especially for producing electrochromic coatings.

The present invention is elucidated in more detail via the following examples and figures, which should not be understood in any way as limiting the concept of the present invention.

EXAMPLES

1. Comparative Example 1

Tungsten(VI) oxytetrachloride was prepared according to the following reaction equation:

$$WCl_6 + Me_3Si-O-SiMe_3 \rightarrow WOCl_4 + 2Me_3SiCl \quad (Comp.\ 1)$$

An analysis of the tungsten(VI) oxytetrachloride obtained, including the chemical purity, the crystalline phases detected, the particle size and the bulk density, is set forth in Table 1.

As is apparent from FIG. 1, which shows an x-ray diffraction pattern of the tungsten(VI) oxytetrachloride obtained, there were significant fractions of $WO_2Cl_2$ in addition to the desired compound.

Figure 2:
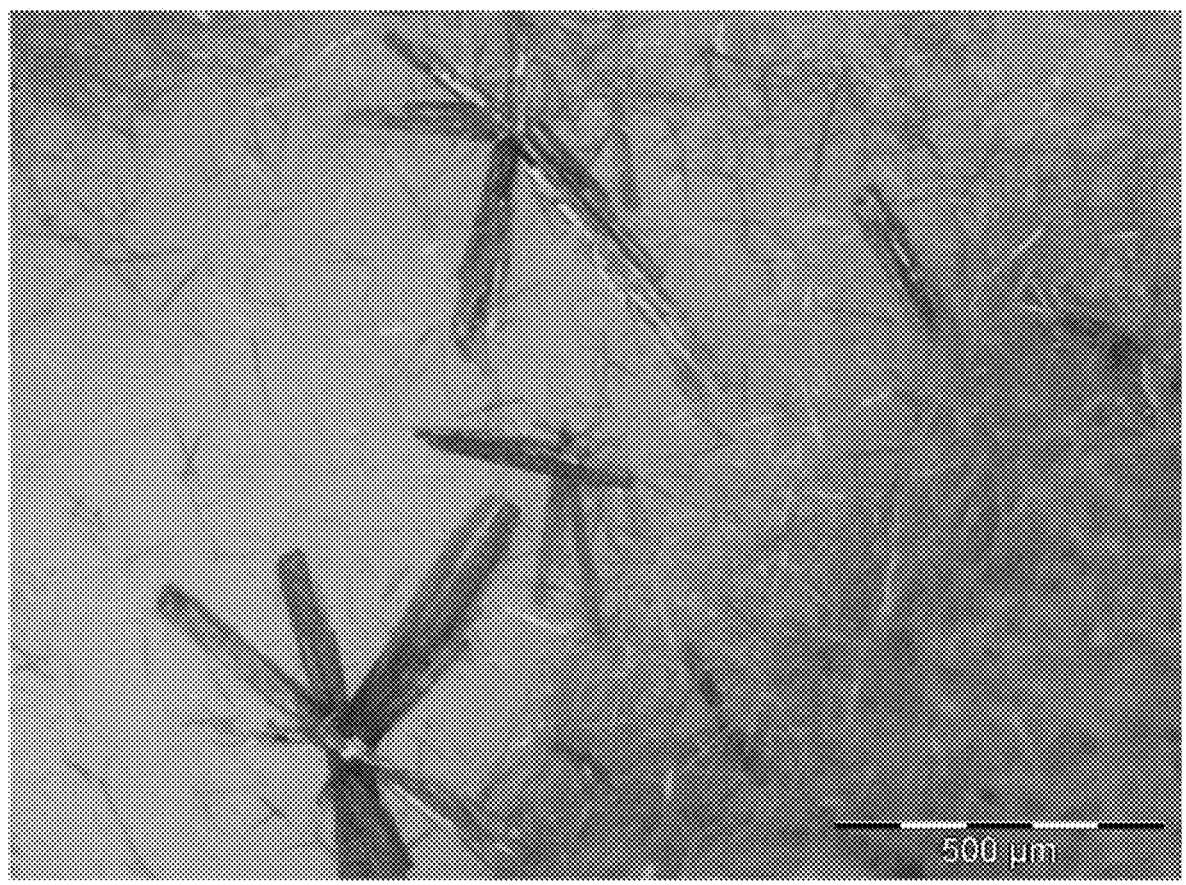
FIG. 2 shows an optical micrograph of the tungsten(VI) oxytetrachloride prepared according to the formula of Comparative Example 1, with the acicular shape of the crystals being clearly apparent and less than 40% of all the particles having a size of less than 100 μm.
Figure 3:
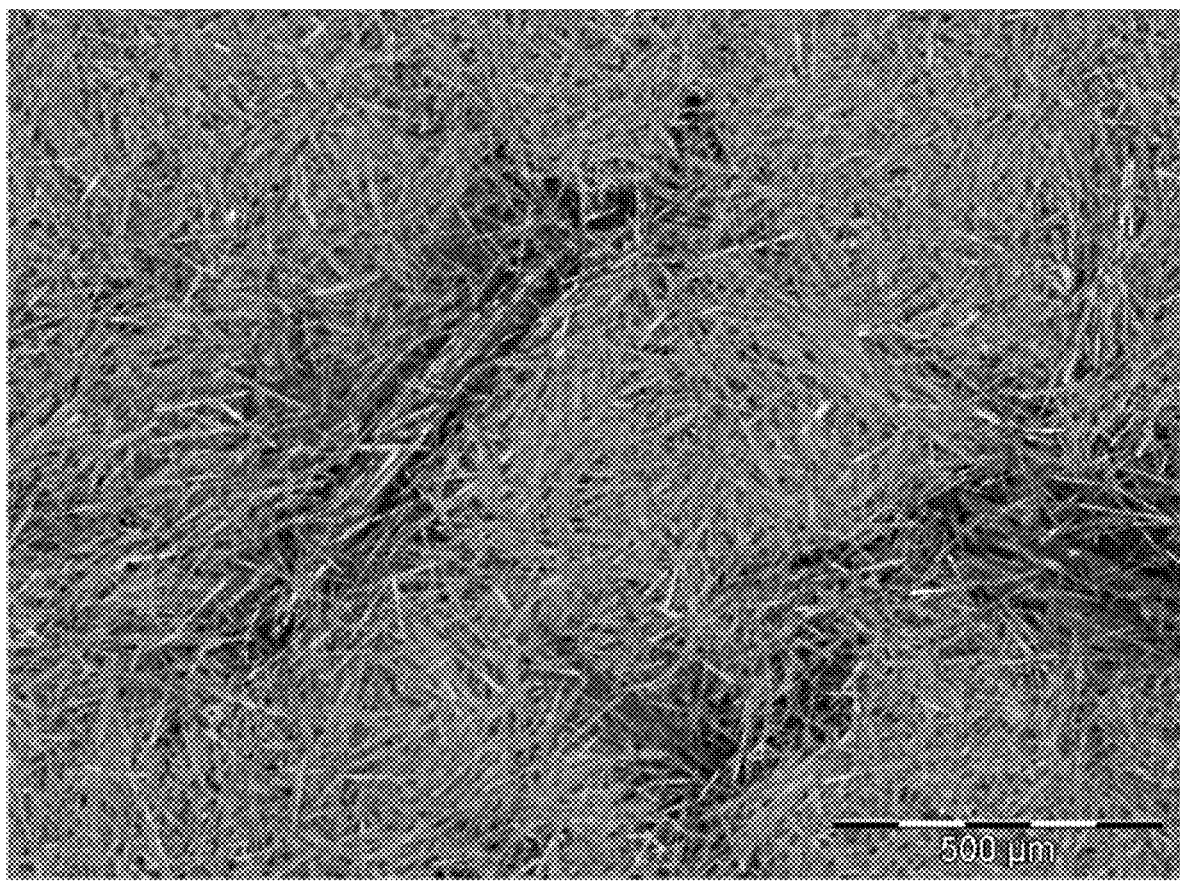
FIG. 3 shows an optical micrograph of the tungsten(VI) oxytetrachloride prepared according to the formula of Comparative Example 1, with the acicular shape of the crystals being clearly apparent and less than 40% of all the particles having a size of less than 100 μm.

FIGS. 2 and 3 show optical micrographs of the tungsten (VI) oxytetrachloride prepared according to the formula Comp. 1, with the acicular shape of the crystals being clearly apparent and less than 40% of all the particles having a size of less than 100 μm.

2. Comparative Example 2

As a further comparison, tungsten(VI) oxytetrachloride was prepared according to the following reaction equation:

$$WO_3 + 2SOCl_2 \rightarrow WOCl_4 + 2SO_2 \quad (Comp.\ 2)$$

An analysis of the tungsten(VI) oxytetrachloride obtained, including the chemical purity, the crystalline phases detected, the particle size and the bulk density, is set forth in Table 1.

Figure 4:
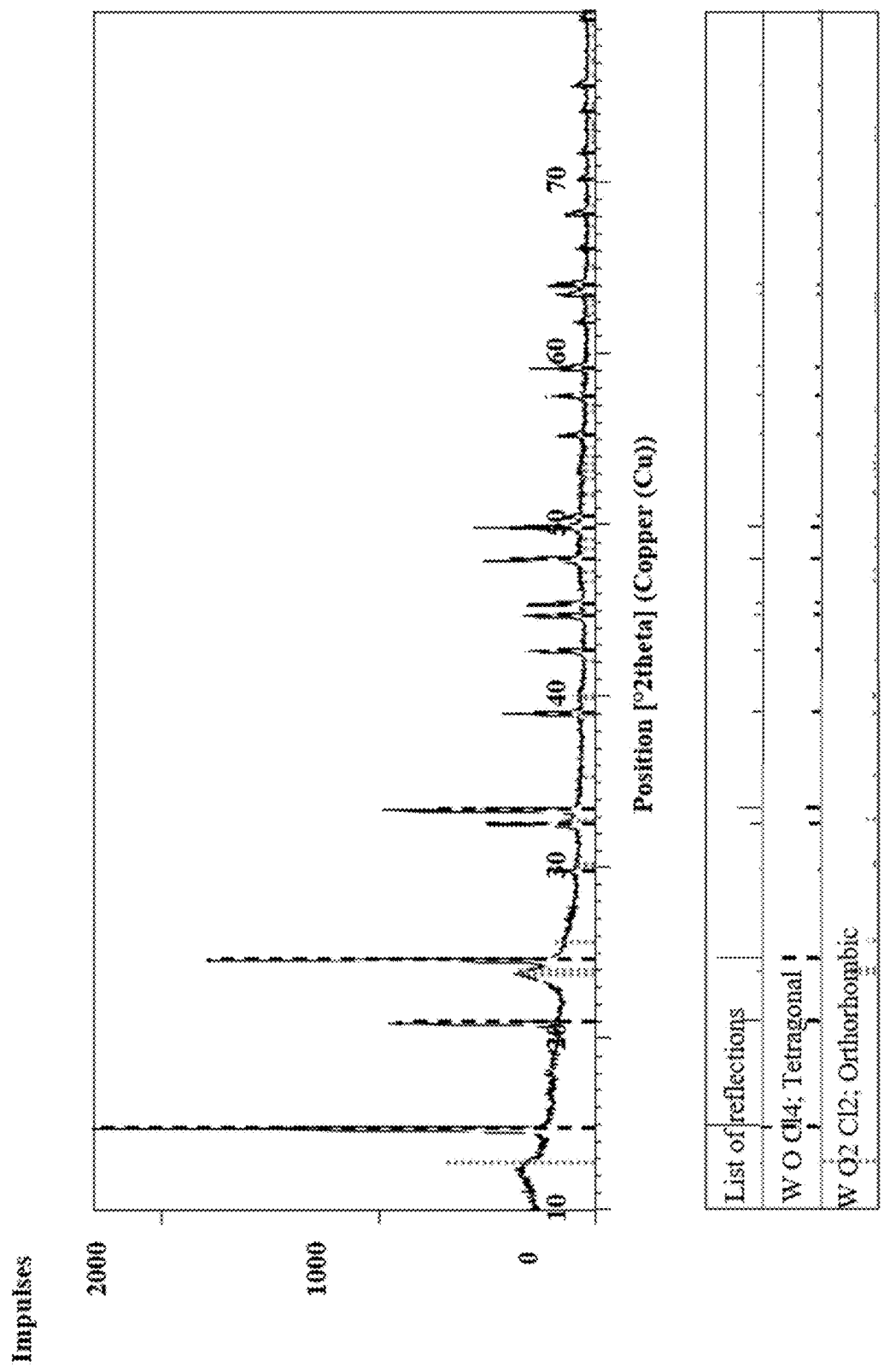
FIG. 4 shows an x-ray diffraction pattern of the product obtained from Comparative Example 2 which demonstrates the presence of $WO_2Cl_2$ as a secondary product, as well as the desired tungsten(VI) oxytetrachloride.

An x-ray diffraction pattern of the product demonstrates the presence of $WO_2Cl_2$ as a secondary product in addition to the desired tungsten(VI) oxytetrachloride (FIG. 4).

FIG. 4 shows an optical micrograph of the tungsten(VI) oxytetrachloride prepared according to the formula Comp. 2, with the acicular shape of the crystals being clearly apparent and less than 10% of all the particles having a size of less than 100 μm.

3. Comparative Example 3

As a further comparison, tungsten(VI) oxytetrachloride was prepared according to the following reaction equation in a one-step reaction at 800° C.:

$$W + 2Cl_2 + 0.5O_2 \rightarrow WOCl_4 \quad (Comp.\ 3)$$

An analysis of the tungsten(VI) oxytetrachloride obtained, including the chemical purity, the crystalline phases detected, the particle size and the bulk density, is set forth in Table 1.

Figure 5:
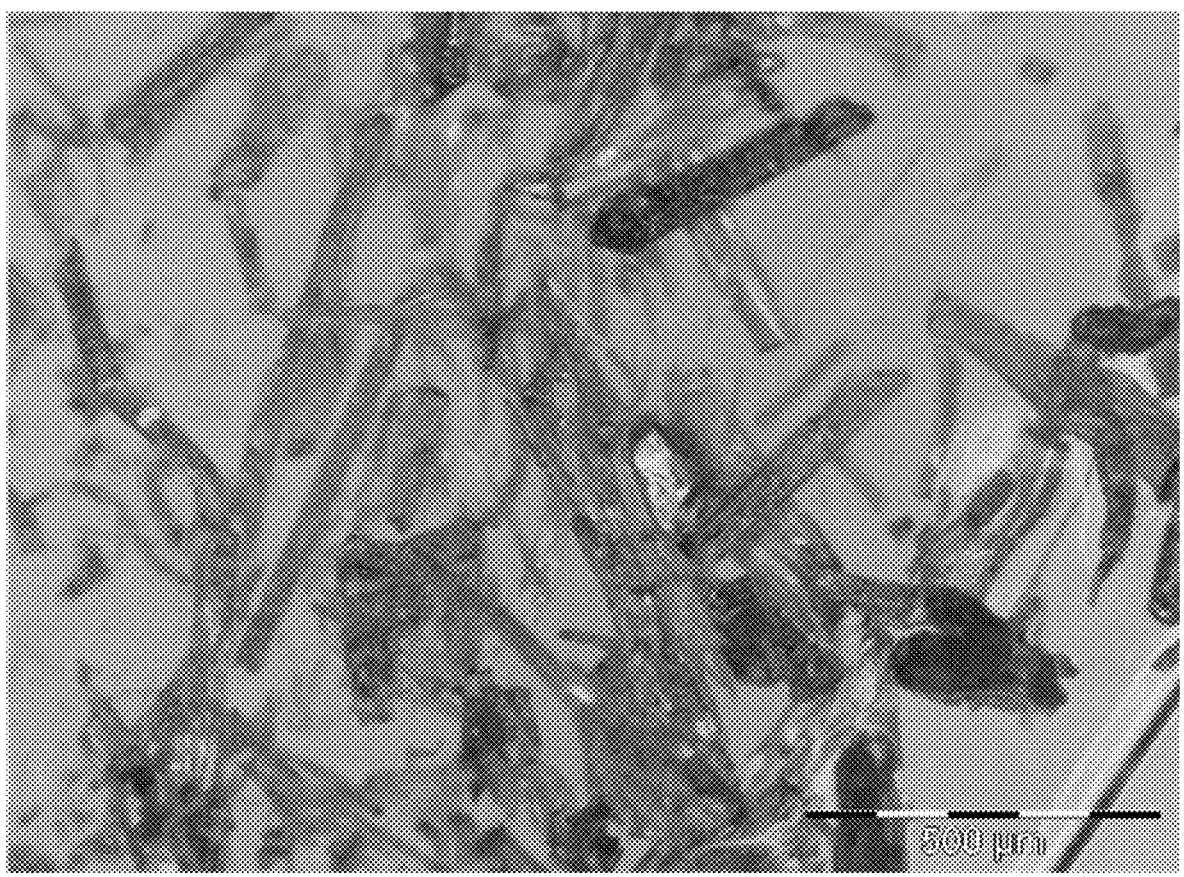
FIG. 5 shows an optical micrograph of the tungsten(VI) oxytetrachloride prepared according to the formula of Comparative Example 2, with the acicular shape of the crystals being clearly apparent and less than 10% of all the particles having a size of less than 100 μm.
Figure 6:
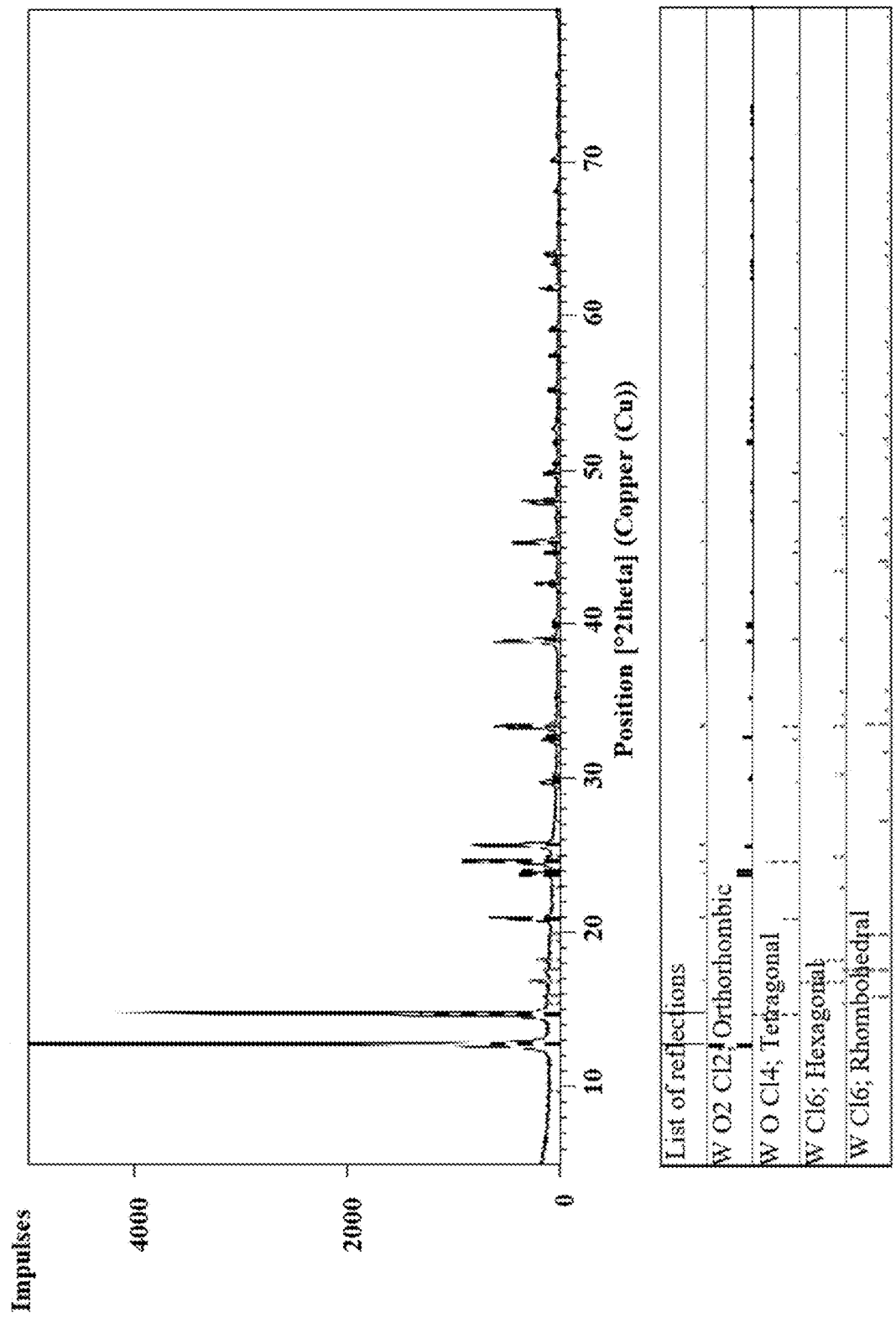
FIG. 6 shows an x-ray diffraction pattern of the tungsten (VI) oxytetrachloride obtained from Comparative Example 3 which shows significant amounts of $WCl_6$ and also $WO_2Cl_2$ in addition to the desired tungsten(VI) oxytetrachloride.

The tungsten(VI) oxytetrachloride obtained gave an x-ray diffraction pattern (FIG. 5) which in addition to the desired tungsten(VI) oxytetrachloride also contained significant amounts of $WCl_6$ and also $WO_2Cl_2$. It should be noted that in this experiment $WO_2Cl_2$ constitutes the main phase, and tungsten(VI) oxytetrachloride only a secondary phase. Reproduction tests under identical conditions confirmed the incidence of these three compounds in changing proportions based on x-ray diffraction analyses. It was not possible to produce a pure-phase tungsten(VI) oxytetrachloride via the one-step reaction.

Optical micrographs of the tungsten(VI) oxytetrachloride prepared according to the formula Comp. 3 also clearly showed an acicular form of the crystals, with less than 50% of all the particles having a size of less than 100 μm.

TABLE 1

| Experiment | X-Ray Diffractometry Qualitative Phase Composition MP Main Phase SP Secondary Phases | X-Ray Diffractometry Quantitative Phase Composition I(P2)100/I(WOCl4)100 | Particle Size (optical microscopy) Percentage Number of Particles < 100 μm [%] | Chemical Trace Analysis Si [ppm] | Chemical Trace Analysis S [ppm] | Chemical Trace Analysis C [ppm] |
|---|---|---|---|---|---|---|
| Comp. 1 | $WOCl_4$(MP), $WO_2Cl_2$(SP) | 0.052 | <40% | 55 | 21 | 981 |
| Comp. 2 | $WOCl_4$(MP), $WO2Cl_2$(SP) | 0.108 | <10% | 15 | 352 | 240 |

TABLE 1-continued

| | | | | | | |
|---|---|---|---|---|---|---|
| Comp. 3 | $WO_2Cl_2$(MP), $WOCl_4$(SP), $WCl_6$ (SP) | 1.19 | <50% | 6 | 11 | 21 |

| | Chemical Trace Analysis | | | | | |
|---|---|---|---|---|---|---|
| Experiment | Mo [ppm] | Fe [ppm] | Sum Total of all Metallic Impurities [ppm] | Sum Total of all Impurities including all Non-Metals and Si [ppm/wt %] | Chemical Purity [%] | Bulk Density [g/cm³] |
| Comp. 1 | 10 | 71 | 135 | 1192/0.1192 | 99.8808 | 0.43 |
| Comp. 2 | 11 | 80 | 104 | 711/0.0711 | 99.9289 | 0.33 |
| Comp. 3 | 9 | 10 | 68 | 106/0.0106 | 99.9894 | 0.39 |

4. Inventive Examples 4.0-4.8

Tungsten(VI) oxytetrachloride was prepared in accordance with the present invention via a two-step process where, in a first step a), tungsten metal powder having a particle size D90 of less than 150 μm was brought to reaction at 800° C. in a $Cl_2$ gas stream and with an addition of oxygen in a stoichiometric ratio of 0.85, based on the amount of tungsten used.

The received intermediate reaction product contains, due to the substoichiometric addition of oxygen (stoichiometric ratio of 0.85) significant amounts of $WCl_6$ in addition to the desired tungsten(VI) oxytetrachloride.

This intermediate was reacted according to step b) under various oxidation conditions to give the tungsten(VI) oxytetrachloride of the present invention; the oxidation conditions and also all relevant analytical results for the powders produced under Experiments 4.1 to 4.8 are set forth in Table 2. The oxidation took place in a conditioning cabinet with water, with the cabinet controlling the relative atmospheric humidity and the temperature as indicated in Table 2.

An analysis of the tungsten(VI) oxytetrachloride obtained, including the chemical purity, the crystalline phases detected, the particle size, and the bulk density, is also set forth in Table 2 under Experiment 4.0.

TABLE 2

| | Results | | | | | | | |
|---|---|---|---|---|---|---|---|---|
| | Reaction Conditions step b) | | | | X-Ray Diffractometry | | Particle Size (optical microscopy) | |
| | Relative | | | | Qualitative Phase Composition | Quantitative Phase Composition | Percentage Number of | Chemical Trace Analysis |
| Experiment | atmos. humidity [%] | Temperature [° C.] | Time [h] | | MP main phase SP secondary phases | I(P2)100/ I(WOCl4)100 | Particles < 100 μm [%] | Si [ppm] | S [ppm] |
| 4.0 | Starting material from step a) | | | | $WOCl_4$(MP), $WCl_6$(SP) | 0.442 | >95% | 4 | 9 |
| 4.1 | 60 | 5 | 1 | | $WOCl_4$(MP), $WCl_6$(SP) | 0.01 | >95% | 3 | 9 |
| 4.2 | 60 | 25 | 0.5 | | $WOCl_4$ | No sec. phase | >95% | 4 | 9 |
| 4.3 | 60 | 25 | 1 | | $WOCl_4$ | No sec. phase | >95% | 4 | 8 |
| 4.4 | 40 | 60 | 0.5 | | WOCl4 | No sec. phase | >95% | 2 | 9 |
| 4.5 | 60 | 60 | 0.5 | | WOCl4 | No sec. phase | >95% | 4 | 6 |
| 4.6 | 80 | 60 | 0.5 | | $WOCl_4$(MP), $WO_2Cl_2$(SP) | 0.0025 | >95% | 4 | 7 |
| 4.7 | 60 | 90 | 0.2 | | $WOCl_4$(MP), $WO2Cl_2$(SP) | 0.097 | >95% | 4 | 9 |
| 4.8 | 60 | 90 | 0.5 | | $WOCl_4$(MP), $WO_2Cl_2$(SP) | 0.471 | >95% | 3 | 5 |

| | Results | | | | | |
|---|---|---|---|---|---|---|
| | Chemical Trace Analysis | | | | | |
| Experiment | C [ppm] | Mo [ppm] | Fe [ppm] | Sum Total of all Metallic Impurities [ppm] | Sum Total of all Impurities including all Non-Metals and Si [ppm] | Chemical Purity [%] | Bulk Density [g/cm³] |
| 4.0 | 15 | 9 | 5 | 65 | 93 | 99.9907 | 0.59 |
| 4.1 | 16 | 8 | 8 | 60 | 88 | 99.9912 | 0.61 |
| 4.2 | 12 | 9 | 6 | 63 | 88 | 99.9912 | 0.58 |
| 4.3 | 17 | 7 | 9 | 67 | 96 | 99.9904 | 0.58 |
| 4.4 | 16 | 9 | 6 | 65 | 92 | 99.9908 | 0.61 |
| 4.5 | 19 | 6 | 7 | 68 | 97 | 99.9903 | 0.58 |
| 4.6 | 11 | 9 | 6 | 61 | 83 | 99.9912 | 0.63 |

TABLE 2-continued

| | | | | | | | |
|---|---|---|---|---|---|---|---|
| 4.7 | 15 | 5 | 4 | 68 | 96 | 99.9904 | 0.65 |
| 4.8 | 15 | 8 | 5 | 65 | 88 | 99.9912 | 0.64 |

Figure 7:
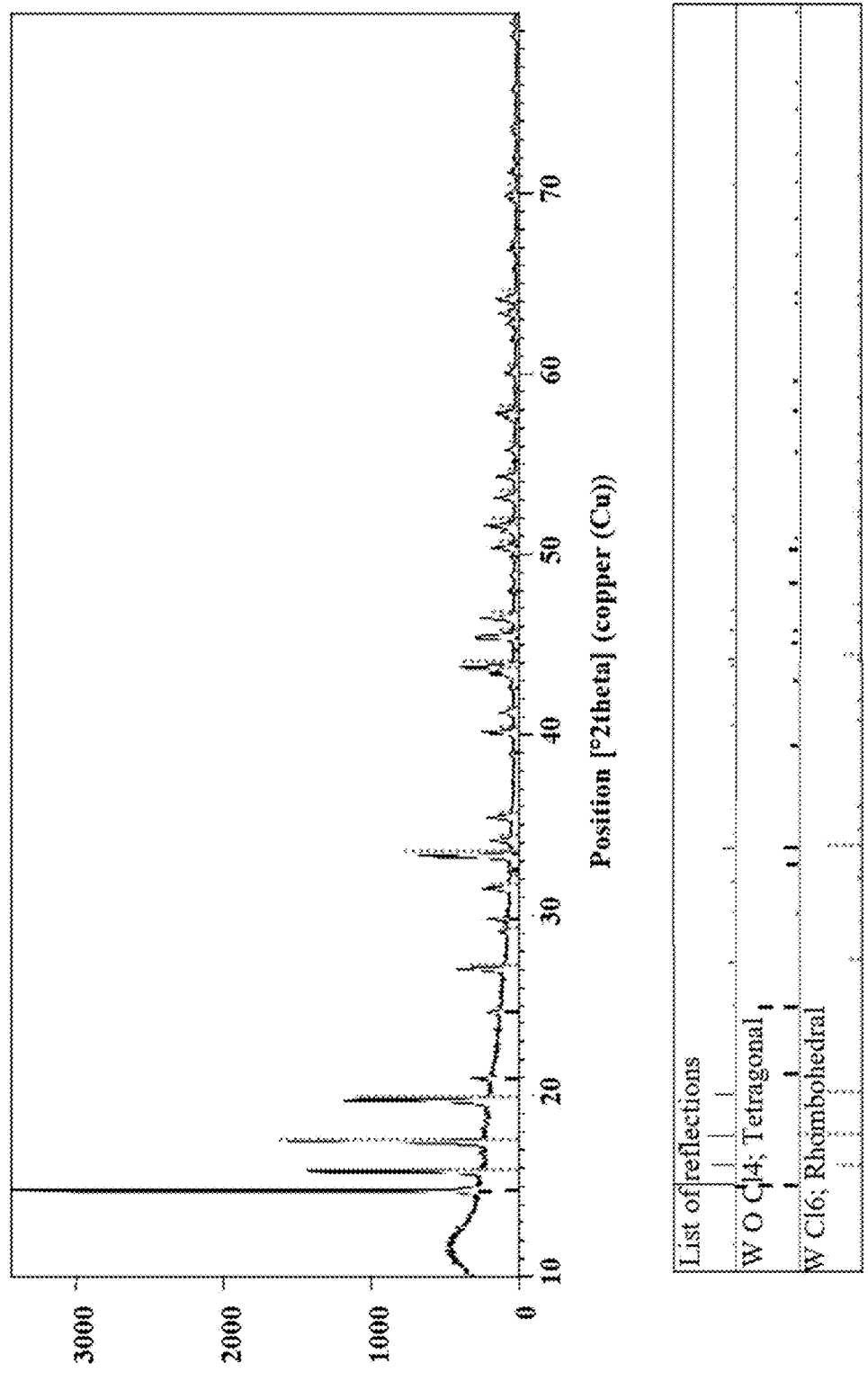
FIG. 7 shows an x-ray diffraction pattern of the intermediate obtained from Example 4.0, obtained after step a), which shows that no tungsten compounds other than the stated compounds $WOCl_4$ and $WCl_6$ are present.

FIG. 7 shows an x-ray diffraction pattern of the intermediate from Experiment 4.0, obtained after step a). As is apparent from the pattern, no tungsten compounds are present other than the stated compounds $WOCl_4$ and $WCl_6$.

Figure 8:
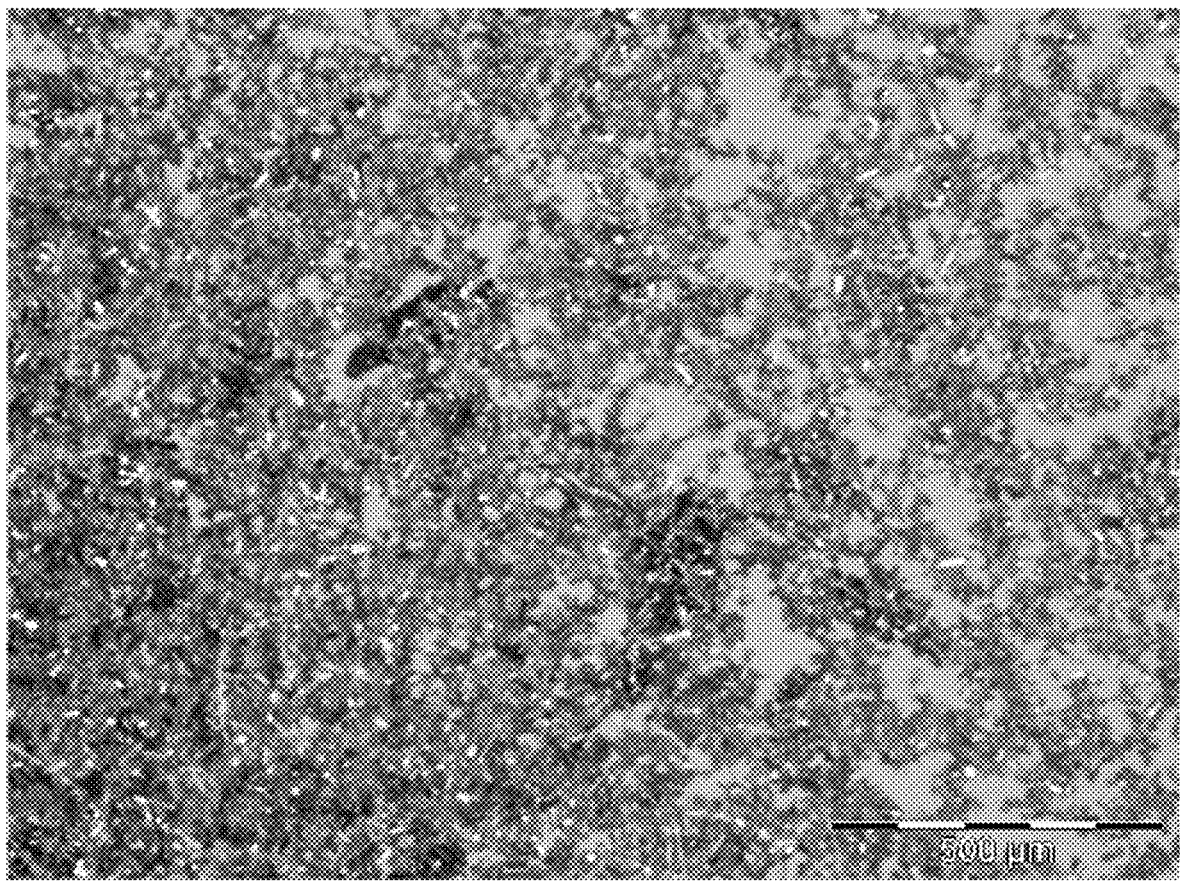
FIG. 8 shows an optical micrograph of the product after step a)

FIG. 8 shows an optical micrograph of the product after step a). In contrast to the conventional production methods, the powder is not in the form of acicular crystals. Instead, the particle size of more than 95% of the total number of the powder particles is less than 100 μm, based on the longest longitudinal dimension of the particles.

Figure 9:
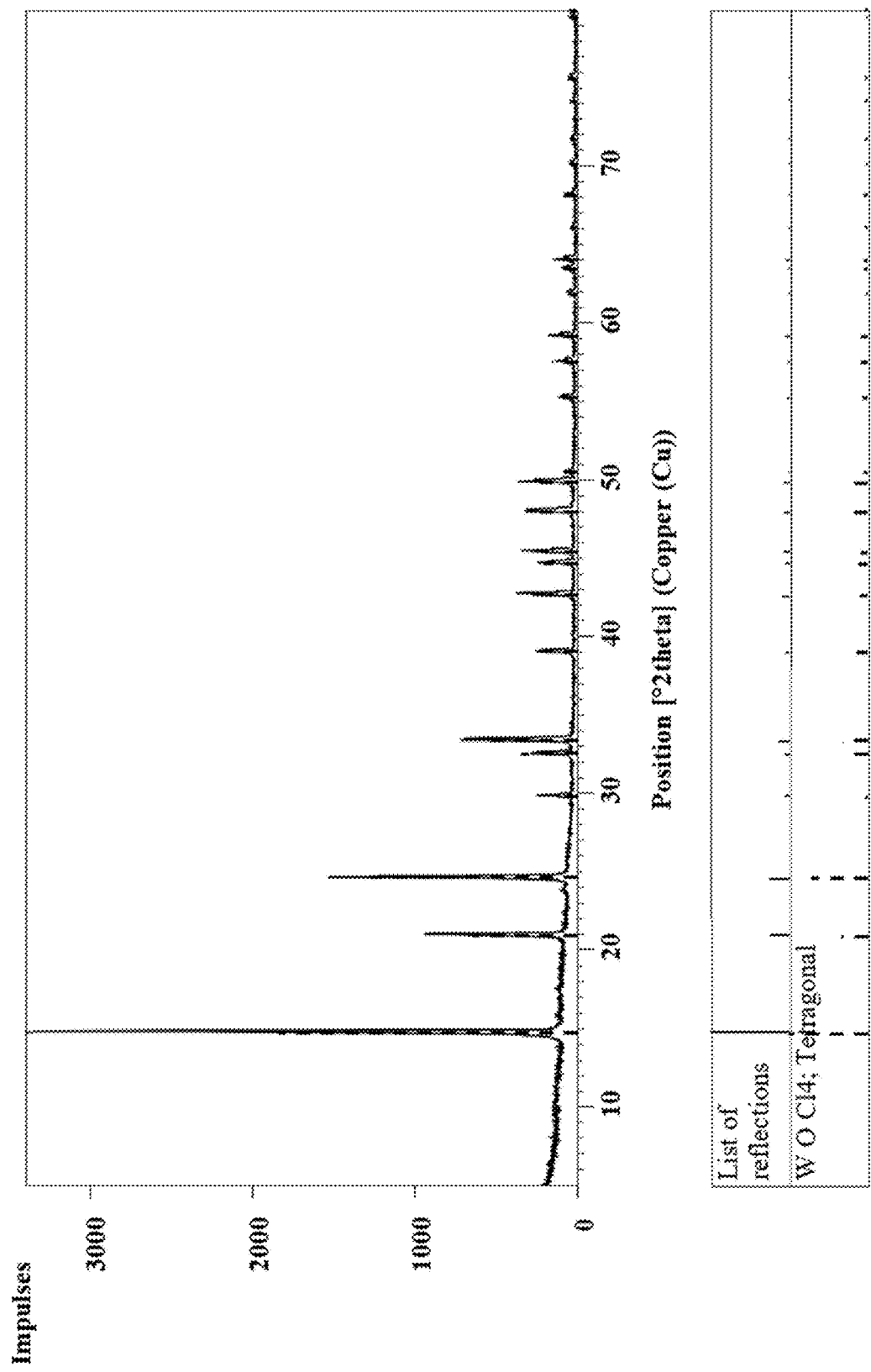
FIG. 9 shows an x-ray diffraction pattern of the product from Example 4.2, obtained after step b), which shows that there was complete oxidation of the $WCl_6$ to give the desired $WOCl_4$.

FIG. 9 shows an x-ray diffraction pattern of the product from Experiment 4.2, obtained after step b). As is apparent from the pattern, there was complete oxidation of the $WCl_6$ to give the desired $WOCl_4$.

Figure 10:
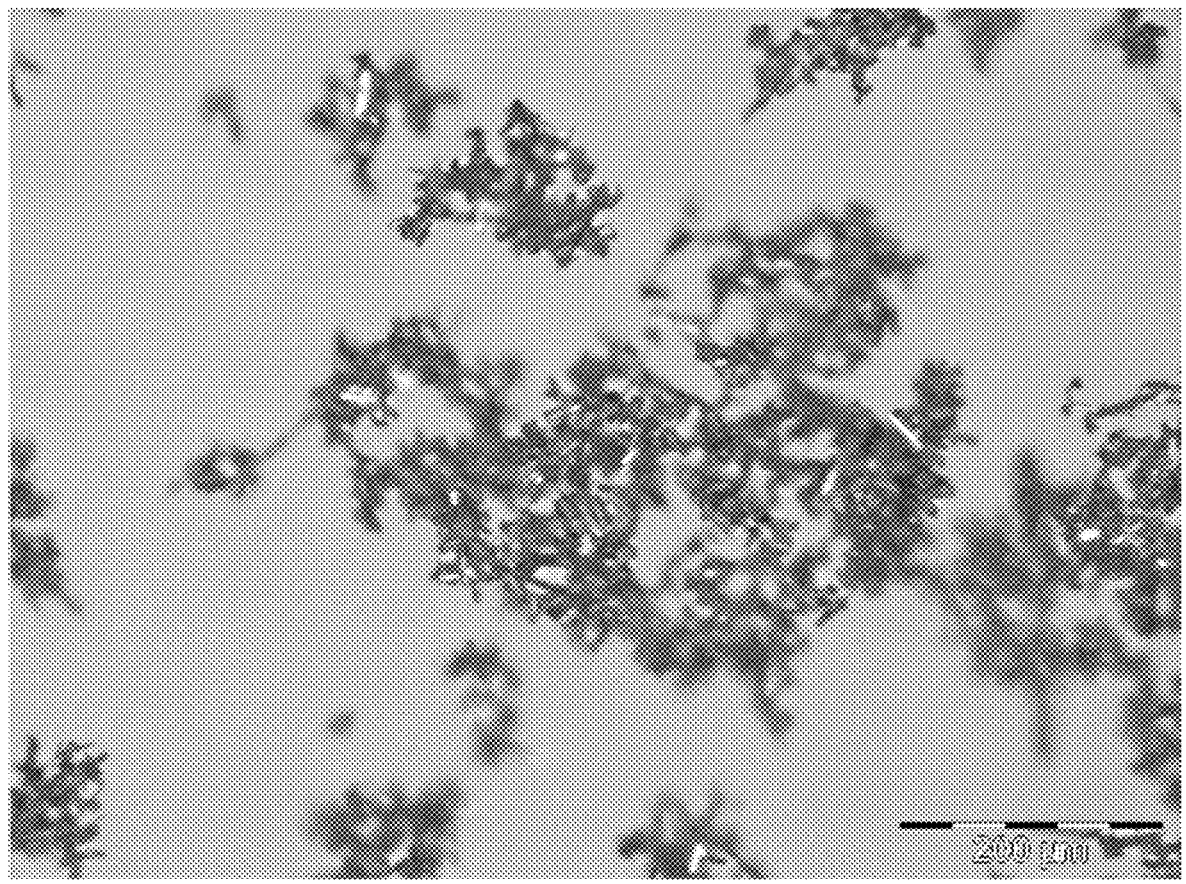
FIG. 10 shows an optical micrograph which shows that the morphology of the tungsten(VI) oxytetrachloride was not affected in any way by the oxidation.

As shown by the optical micrograph in FIG. 10, the morphology of the tungsten(VI) oxytetrachloride was not affected in any way by the oxidation. The end product of Experiment 4.2 also shows that the tungsten(VI) oxytetrachloride was in the form of small particles having a particle size of less than 100 μm for more than 95% of the overall number of the powder particles.

As is apparent from Table 2, in Experiments 4.1 to 4.6, tungsten(VI) oxytetrachlorides of the present invention were prepared that had a chemical purity of greater than 99.95% and contained no detectable secondary phases or secondary phases with an $I(P2)100/I(WOCl_4)100$ ratio of less than 0.03, as a result, in particular, of control over the oxidation conditions during step b). If the process window for the oxidation is departed from, as in Experiments 4.7 and 4.8, rapidly increasing amounts of $WO_2Cl_2$ are formed, becoming visible as a result of an increase in the $I(P2)100/I(WOCl_4)100$ ratio.

The fractions of crystalline tungsten compounds are ascertained by means of x-ray diffractometry, determined, for example, on powder samples using an instrument from Malvern-PANalytical (X'Pert-MPD with semiconductor detector, Cu LFF x-ray tube with 40 KV/40 mA, Ni filter). In the qualitative analysis of the x-ray diffraction patterns, the reflections ascertained were assigned to tungsten compound reflections known from the literature.

The trace analysis of the chemical impurities was carried out by ICP-OES using the analytical instruments PQ 9000 (Analytik Jena) or Ultima 2 (Horiba). The chemical purity ascertained is obtained arithmetically as the difference between the hypothetical contamination-free sample at 100 wt % and the sum total of all impurities, including all non-metals and Si, in wt %.

The present invention is not limited to embodiments described herein; reference should be had to the appended claims.

What is claimed is:

1. A tungsten (VI) oxytetrachloride comprising:
a chemical purity of greater than 99.95%,
wherein,
the tungsten (VI) oxytetrachloride comprises a fraction of compounds selected from the group consisting of $WCl_6$, $WO_2Cl_2$, $WO_3$ and $WO_2$, as defined as a ratio of a reflection having a highest intensity of one of $WCl_6$, $WO_2Cl_2$, $WO_3$ and $WO_2$, (I(P2)100) in an x-ray diffraction pattern to a reflection having a highest intensity of the tungsten (VI) oxytetrachloride (I($WOCl_4$)100) in the x-ray diffraction pattern, expressed as I(P2)100/I($WOCl_4$)100, of less than 0.03.

2. The tungsten (VI) oxytetrachloride as recited in claim 1, wherein the chemical purity is greater than 99.99%.

3. The tungsten (VI) oxytetrachloride as recited in claim 1, further comprising:
at least one of silicon and compounds of silicon in an amount of less than 50 ppm, based on a total weight of the tungsten (VI) oxytetrachloride.

4. The tungsten (VI) oxytetrachloride as recited in claim 1, further comprising:
at least one of sulfur and compounds of sulfur in an amount of less than 100 ppm, based on a total weight of the tungsten (VI) oxytetrachloride.

5. The tungsten (VI) oxytetrachloride as recited in claim 1, further comprising:
at least one of a fraction of molybdenum and a fraction of molybdenum compounds of less than 20 ppm, based on a total weight of the tungsten (VI) oxytetrachloride.

6. The tungsten (VI) oxytetrachloride as recited in claim 1, wherein a fraction of metallic impurities in the tungsten (VI) oxytetrachloride is less than 100 ppm, based on a total weight of the tungsten (VI) oxytetrachloride.

7. The tungsten (VI) oxytetrachloride as recited in claim 1, further comprising:
carbon in an amount of less than 200 ppm, based on a total weight of the tungsten (VI) oxytetrachloride.

8. The tungsten (VI) oxytetrachloride as recited in claim 1, wherein the tungsten (VI) oxytetrachloride is a powder where 90% of all particles of the powder have a particle size of 100 μm or less, as determined by optical microscopy.

9. The tungsten (VI) oxytetrachloride as recited in claim 1, wherein the tungsten (VI) oxytetrachloride has a bulk density of greater than 0.5 g/cm$^3$.

10. A method for producing the tungsten (VI) oxytetrachloride as recited in claim 1, the method comprising:
a step a) of reacting a tungsten metal with a chlorine gas and oxygen to provide a product mixture; and
a step b) of oxidizing the product mixture in the presence of an oxidizing agent to provide the tungsten (VI) oxytetrachloride.

11. The method as recited in claim 10, wherein the oxidizing agent in step b) is selected from the group consisting of oxygen, water and steam.

12. The method as recited in claim 10, wherein the oxidizing in step b) is performed at a relative atmospheric humidity of 20% to 80% with water as the oxidizing agent.

13. The method as recited in claim 10, wherein the oxidizing in step b) is performed at a temperature of 0 to 80° C.

14. The method as recited in claim 10, wherein the oxygen in step a) is used in a substoichiometric proportion where a stoichiometric ratio of oxygen to tungsten metal being 0.8 to 0.97.

15. A method of using the tungsten (VI) oxytetrachloride as recited in claim 1 as a catalyst in a chemical reaction, the method comprising:
providing the tungsten (VI) oxytetrachloride as recited in claim 1; and
using the tungsten (VI) oxytetrachloride as the catalyst in the chemical reaction.

16. The method as recited in claim 15, wherein the chemical reaction at least one of,
provides functional hydrocarbons,
is used in a semiconductor industry,
is used in a sol-gel process, and
provides an electrochromic coating.

* * * * *